United States Patent [19]

Yada

[11] Patent Number: 5,044,684

[45] Date of Patent: Sep. 3, 1991

[54] MOLDING FOR WINDSHIELD OF AUTOMOBILE

[75] Inventor: Yukihiko Yada, Nagoya, Japan

[73] Assignee: Tokai Kogyo Kabushiki Kaisah, Oobu, Japan

[21] Appl. No.: 615,853

[22] Filed: Nov. 20, 1990

[30] Foreign Application Priority Data

Nov. 22, 1989 [JP] Japan .............................. 1-134912[U]

[51] Int. Cl.⁵ .............................................. B60R 13/06
[52] U.S. Cl. ......................................... 296/93; 52/208
[58] Field of Search ....................... 296/93, 84.1, 201; 52/208, 400

[56] References Cited

U.S. PATENT DOCUMENTS

| | | | |
|---|---|---|---|
| 3,666,316 | 5/1972 | Wilfert | 296/93 |
| 4,757,659 | 7/1988 | Miyakawa et al. | 52/208 |
| 4,765,936 | 8/1988 | Ballocca | 264/46.1 |
| 4,865,796 | 9/1989 | Tamura et al. | 264/40.7 |
| 4,884,380 | 12/1989 | Yada et al. | 52/208 |
| 4,968,543 | 11/1990 | Fujioka et al. | 52/208 |
| 4,984,839 | 1/1991 | Miyakama et al. | 296/93 |

*Primary Examiner*—Robert R. Song
*Attorney, Agent, or Firm*—Wenderoth, Lind & Ponack

[57] ABSTRACT

A molding for windshield of an automobile comprises a molding main body and an auxiliary plate, the molding main body consists of a leg portion to be fitted into a gap between the peripheral portion of the windshield and a window opening of the automobile body and a decorative portion for covering the gap. The auxiliary plate consists of an upper portion, side portions and corner portions which are fitted to the inner peripheral side of the decorative portion. The thickness of the side portions is greater than that of the upper portion. The inner peripheral side of the side portions is recessed to function as a rain groove.

3 Claims, 9 Drawing Sheets

MOLDING FOR WINDSHIELD OF AUTOMOBILE

BACKGROUND OF THE INVENTION

1. Field of the Invention

This invention relates to a molding for windshield of an automobile for sealing the gap defined between the peripheral portion of the windshield and a window frame of a body panel and for decorating that portion (hereinafter referred to merely as the "molding") by attaching the molding to the gap.

2. Description of the Prior Art

The molding of this kind has side molding portions provided with rain water guide grooves in order to prevent sideway scattering, due to the operation of a wiper, and subsequent invasion of rain water adhering to the windshield during driving into a driver's seat or the obstruction of the field of view from the driver's seat due to rain water adhering to the door glasses on the sides.

Accordingly, an upper molding portion to be fitted to the upper portion of the windshield and side molding portions to be fitted to its side portions are shaped separately, and are coupled by use of corner joints at the time of fitting. According to this method, however, the number of necessary components increases and the joint portions become recognizable to give an awkward appearance.

Therefore, an integral molding of the upper molding portion and the side molding portions equipped with the rain water grooves is now available. The rain water groove is formed by cutting off the inner peripheral side of each side molding after molding or disposing a groove at the portion which is added by injection molding during a post-step. The former involves the problem in that the width of the side molding becomes smaller than that of the upper molding portion and damages the appearance, whereas the latter carries out injection molding as the post-step, so that the difference in appearance occurs between the extrusion molded portions and the injection molded portion, this difference damages the appearance and moreover, the cost of production becomes higher.

SUMMARY OF THE INVENTION

The molding in accordance with the present invention comprises a molding main body and an auxiliary plate, the molding main body consisting of a leg portion to be fitted into the gap occurring between the peripheral edge portion of the windshield and a window frame of a car body panel and a decorative portion for covering and decorating the gap, the auxiliary plate consisting of an upper portion auxiliary plate, side portion auxiliary plates and corner portion auxiliary plates, and being fitted to the inner peripheral side of the decorative portion of the molding main body, the thickness of the side portion auxiliary plates fitted to both side portions of the windshield being greater than the thickness of the upper portion auxiliary plate fitted to the upper portion of the windshield, and the inner peripheral surface of the side portion auxiliary plates being recessed to function as a rain water groove.

Accordingly, the thickness of the side portion auxiliary plates is made greater than the thickness of the upper portion auxiliary plate by the thickness corresponding to the difference in level between the windshield and the car body panel, not only when the difference is equal at the upper portion and the side portions but also when the difference changes from the upper portion to the side portions In this manner, the sectional shape of the molding main body can be made uniform throughout its full length. As a result, extrusion molding of the molding main body becomes easier. Furthermore, the width of the side portion auxiliary plates can be made greater than the width of the upper portion auxiliary plate and thus the width of the side molding portions can be made greater than the width of the upper molding portion. In consequence, the side molding portions can be made more conspicuous and design appearance can be improved.

DESCRIPTION OF THE PREFERRED EMBODIMENTS

Figure 1:
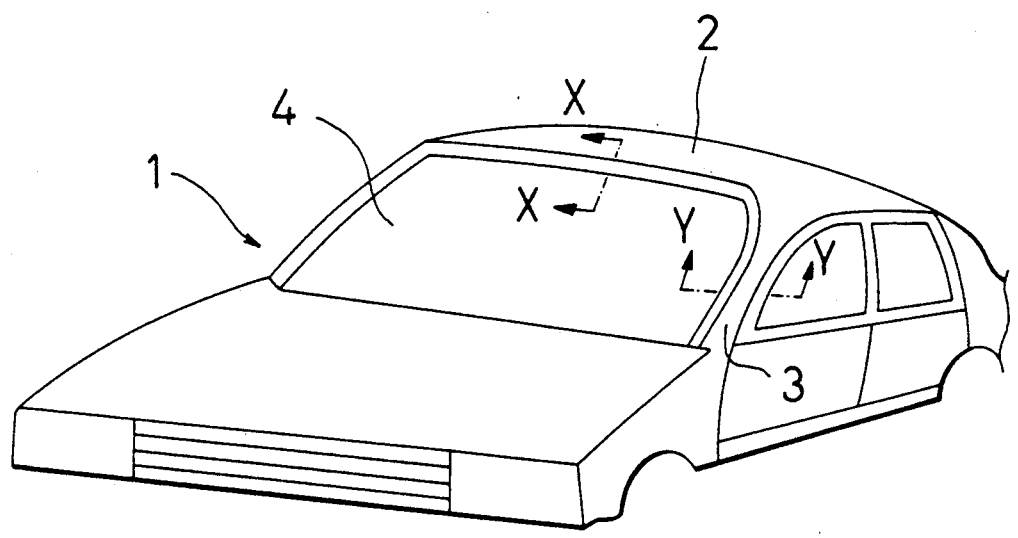
FIG. 1 is a perspective view of an automobile when viewed from front.

A window frame is formed on the front surface of the cabin of an automobile 1 by a roof panel 2 and front pillars 3 as shown in FIG. 1 and a windshield 4 is fitted to this window frame. Later-appearing moldings $M_1$ to $M_4$ are fitted into the gaps between the peripheral portions of the windshield 4 fitted to the window frame and the roof panel 2 and between the peripheral portions and the front pillars 3, respectively, and decorate these portions.

Figure 2:
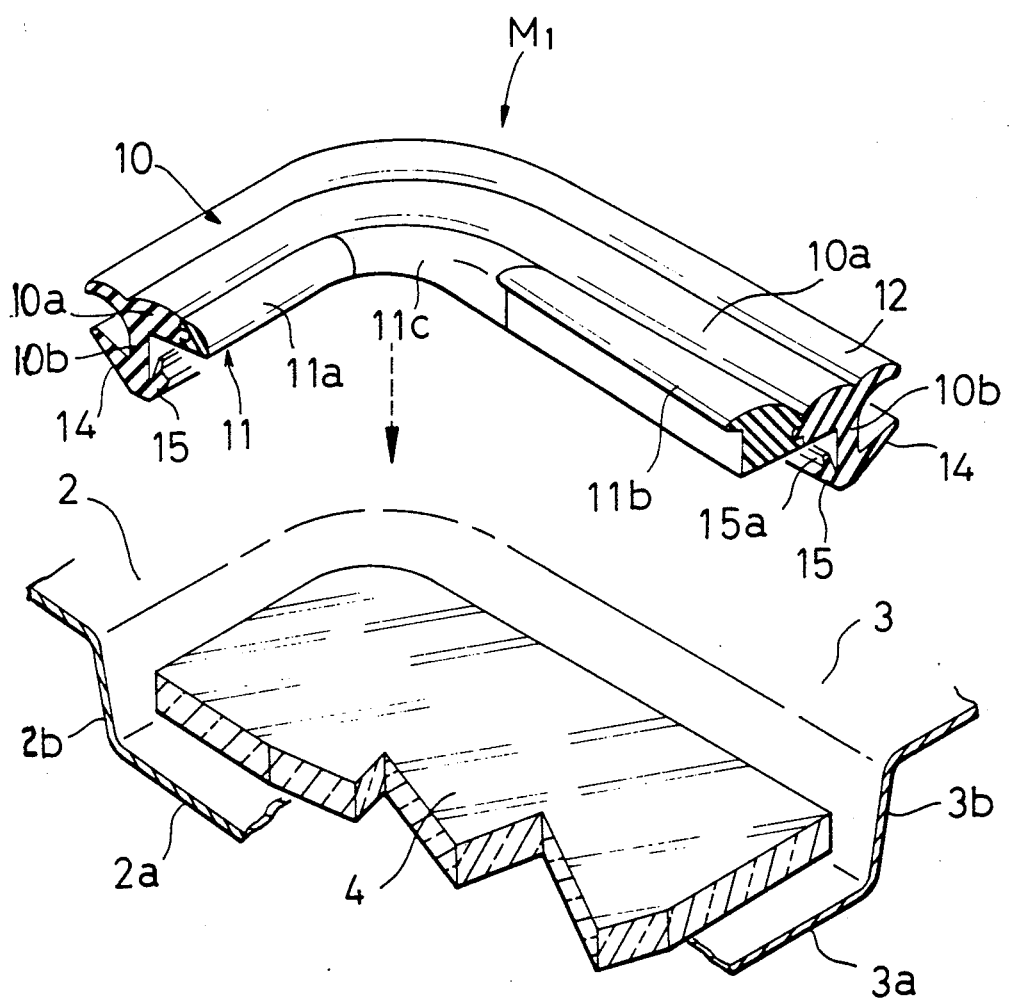
FIG. 2 is a perspective view of a molding $M_1$ and each corner portion of a car body panel.
Figure 3:
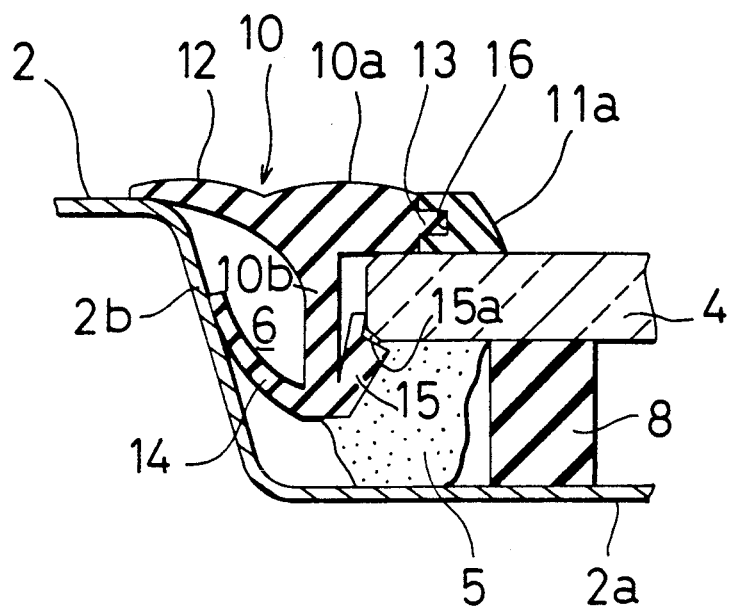
FIGS. 3 and 4 are enlarged sectional views taken along line X—X and line Y—Y in FIG. 1 in the automobile to which the molding $M_1$ is fitted, respectively.
Figure 4:
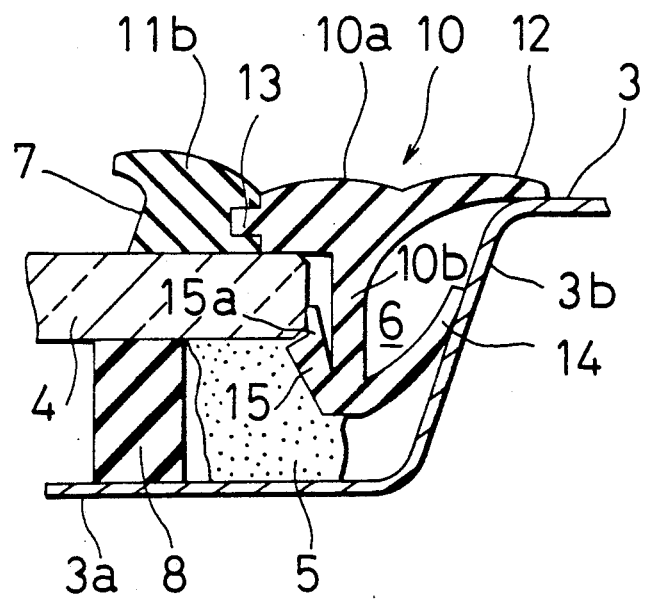

The molding $M_1$ in accordance with the present invention is shown in FIGS. 2 to 4.

The molding $M_1$ comprises a molding main body 10 and an auxiliary plate 11. The molding main body 10 has the same sectional shape throughout its full length and a leg portion 10b is disposed integrally with the lower surface of a decorative portion 10a. A decorative lip 12 is disposed in such a manner as to extend on the outer peripheral side of this decorative portion 10a and a protuberance 13 is disposed on its inner peripheral side. A panel lip 14 and a clamp lip 15 are disposed on the outer and inner peripheral sides of the lower end of the leg portion 10b of the molding main body 10, respectively. An engagement step portion 15a engaging with the peripheral edge of the lower surface of the windshield 4 is formed at the tip of the clamp lip 15.

The auxiliary plate 11 comprises an auxiliary plate 11a for an upper portion, an auxiliary plate 11b for a side portion and an auxiliary plate 11c for a corner portion.

A fitting groove 16 is defined on the outer peripheral side of the auxiliary plate 11. The side portion auxiliary plate 11b is thicker and wider than the upper portion auxiliary plate 11a, and the inner peripheral surface 7 of the side portion auxiliary plate 11b is recessed. The corner portion auxiliary plate 11c is recessed in such a manner as to match the shape of the corner portion of the windshield 4 and connects the upper portion auxiliary plate 11a and the side portion auxiliary plate 11b with each other. Therefore, the sectional shape of the corner portion auxiliary plate 11b changes progressively and the sectional shapes at its both end portions coincide with the sectional shapes of the upper portion auxiliary plate 11a and side portion auxiliary plate 11b, respectively.

The windshield 4 is bonded to the flange portion 2a of the roof panel 2 and to the flange portions 3a of the front pillars 3 by an adhesive 5. When the windshield 4 is fixed to the window frame defined by the roof panel 2 and the front pillars 3 in this manner, predetermined gaps 6 are defined between the peripheral edge portion of the windshield 4 and the roof panel 2 and between the peripheral edge portion of the windshield 4 and each inclined wall portion 2b, 3b of the front pillars 3 and the molding $M_1$ is fitted into the gap 6.

The portion of the molding main body 10 corresponding to each corner portion of the windshield 4 is curved and the protuberance 13 disposed on the inner peripheral side of the molding main body 10 is engaged with the fitting groove 16 disposed on the outer peripheral side of the auxiliary plate 11. Then, the auxiliary plate 11 is integrally fitted to the molding main body 10. When the molding main body 10 is fitted into the gap 6 described above under this state, the leg portion 10b of the molding main body 10 is fitted into the gap 6 at each of the upper and side portions, so that the auxiliary plate 11 comes into close contact with the upper surface of the molding main body 10 and the decorative lip 12 of the molding main body 10 comes into flexible contact with the loof panel 2 and with the front pillars 3. The panel lip 14 formed at the leg portion 10b of the molding main body 10 comes into flexible contact with the inclined wall portion 2b, 3b of each of the roof panel 2 and the front pillars 3 and the clamp lip 15 comes into resilient contact and is engaged with the peripheral edge of the lower surface of the windshield 4. Consequently, the gap 6 is covered with and decorated by the molding main body 10 and the side portion auxiliary plate 11b functions as the rain water groove because the inner peripheral surface 7 is recessed. Incidentally, reference numeral 8 in FIGS. 3 and 4 represents a dam rubber for preventing the outflow of the adhesive 5.

Since the rain water groove is defined by the side portion auxiliary plate 11b as described above, the sectional shape of the molding main body 10 can be made uniform throughout its full length and extrusion molding can be made easily. Since the width of the decorative portion of the side molding portions is greater than that of the upper molding portion under the state where the auxiliary plate 11 is fitted to the inner peripheral side of the molding main body 10, the side molding portions is highlighted and the design effect can be improved.

Figure 5:
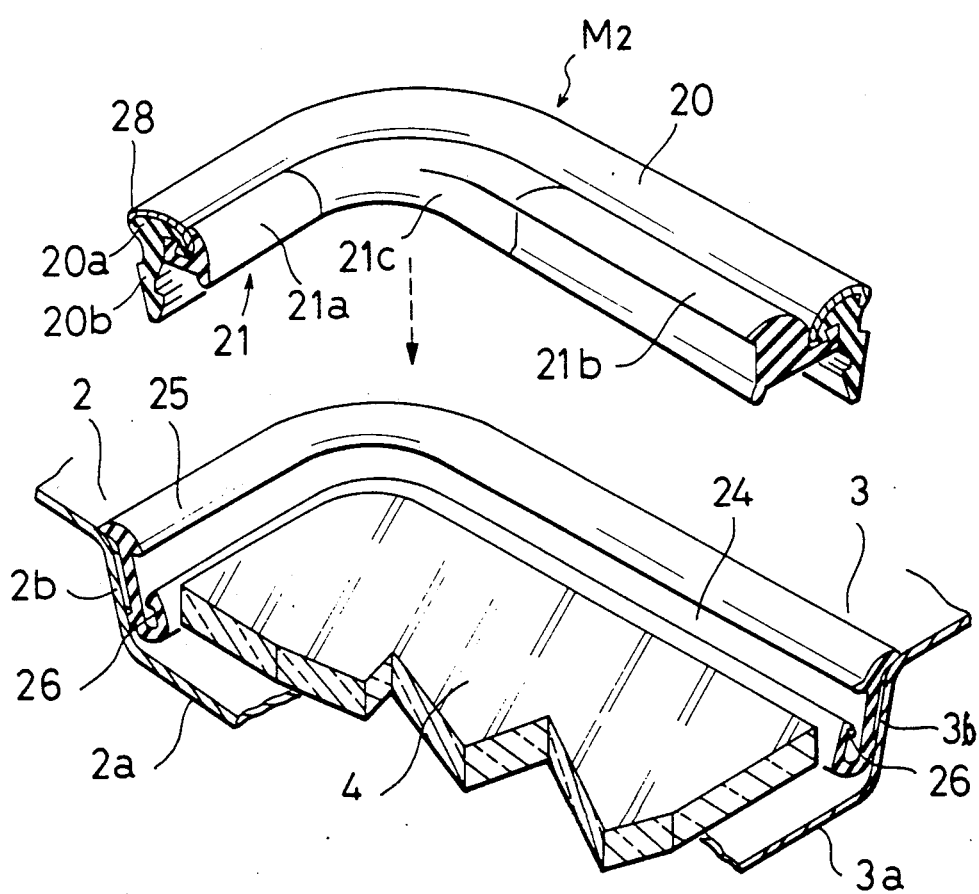
FIG. 5 is a perspective view of a molding $M_2$ and each corner portion of the car body panel.
Figure 6:
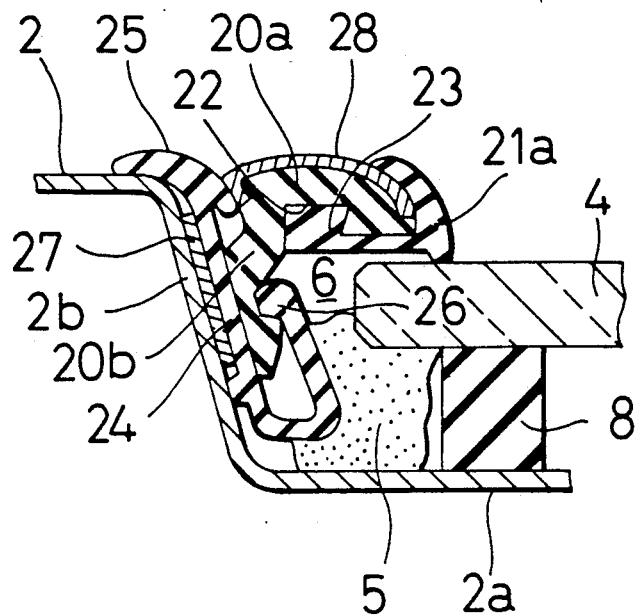
FIGS. 6 and 7 are enlarged sectional views taken along line X—X and line Y—Y in FIG. 1 in the automobile to which the molding $M_2$ is fitted, respectively.
Figure 7:
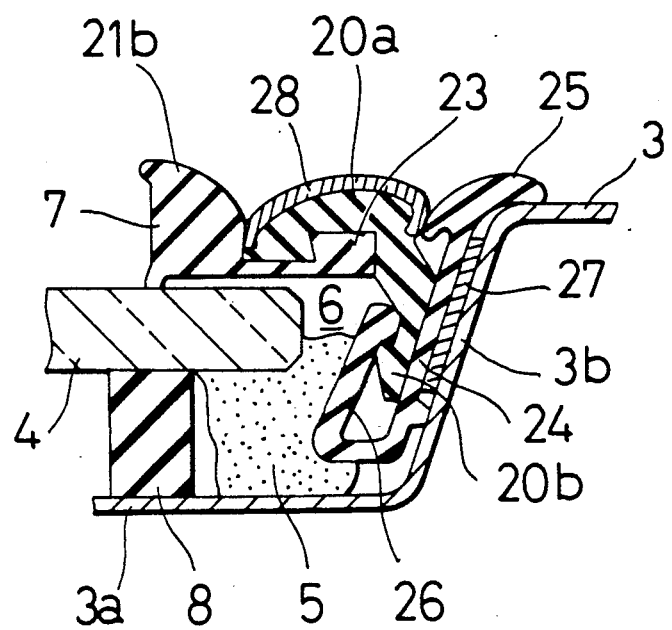

FIGS. 5 to 7 show the molding $M_2$ in accordance with the present invention.

This molding $M_2$ comprises the molding main body 20 and the auxiliary plate 21. The molding main body 20 has the same sectional shape throughout its full length and is equipped integrally with the leg portion 20b on the lower surface on the outer peripheral side of its decorative portion 20a. A fitting groove 22 is formed on the lower surface of the decorative portion 20a in the longitudinal direction. A decorative film 28 is applied to the upper surface of the decorative portion 20a. The auxiliary plate 21 comprises the upper portion auxiliary plate 21b, the side portion auxiliary plate 21b and the corner portion auxiliary plate 21c. The upper portion auxiliary plate 21a is shaped in the arcuate form in such a manner as to cover the inner peripheral side of the decorative portion 20a of the molding main body 20. The side portion auxiliary plate 21b is thicker and wider than the upper portion auxiliary plate 21a and its inner peripheral surface 7 is recessed. A fitting protuberance 23 is disposed on the outer peripheral side of the auxiliary plate 21.

The molding $M_2$ is fitted into the gap 6 through an engagement member 24. This engagement member 24 has a J-shaped sectional shape and is equipped with a decorative lip 25 at its upper end portion and with an engagement plate 26 at its lower end portion The engagement member 24 is bonded to the inclined wall portions 2b, 3b of the roof panel 2 and front pillars 3 by double-coated adhesive tape.

When the fitting protuberance 23 of the auxiliary plate 21 is fitted into the fitting groove 22 of the decorative portion 20a of the molding main body 20, the auxiliary plate 21 is fitted integrally with the molding main body 20. Under this state, the leg portion 20b of the molding main body 20 is fitted into the gap 6 and engaged with the engagement plate 26 of the engagement member 24 and at the same time, the auxiliary plate 21 is brought into close contact with the upper surface of the windshield 4. In this manner, the molding $M_2$ can be fitted into the gap 6 described above.

Figure 8:
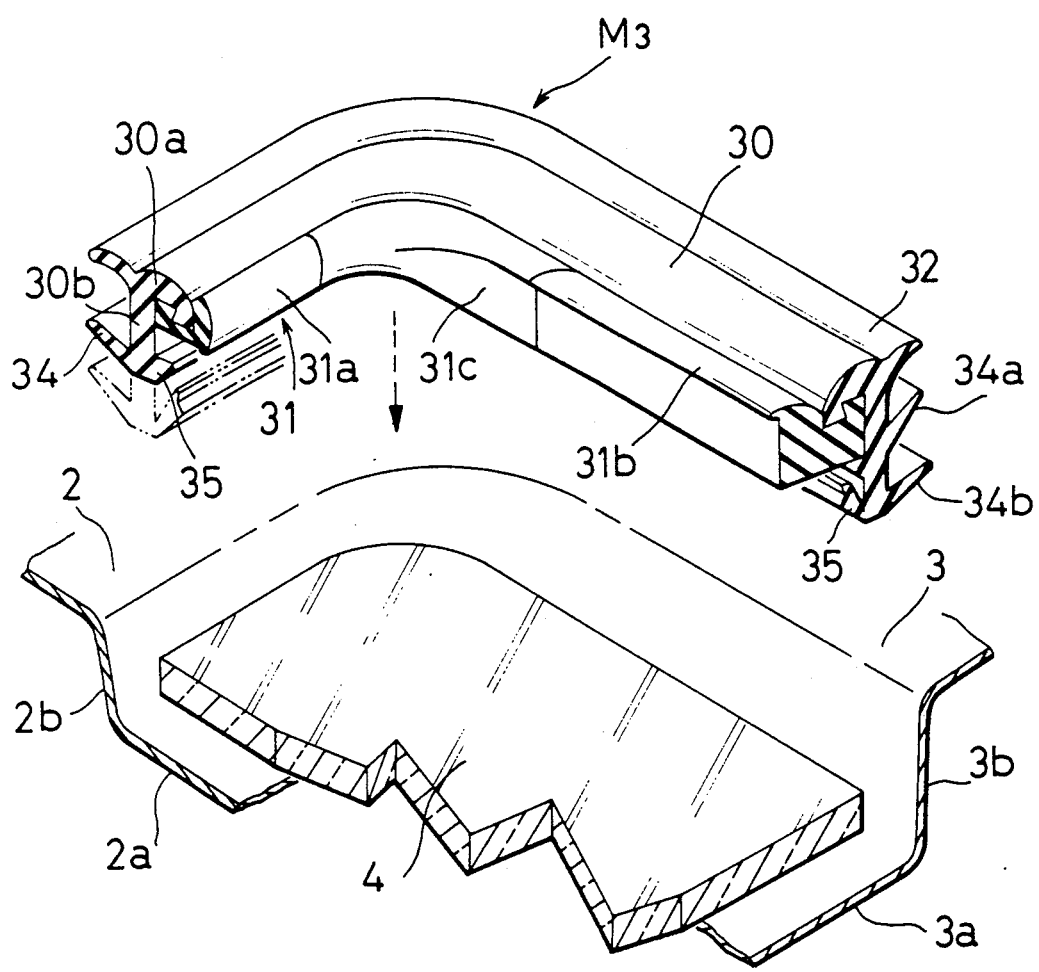
FIG. 8 is a perspective view of a molding $M_3$ and each corner portion of the car body panel.
Figure 9:
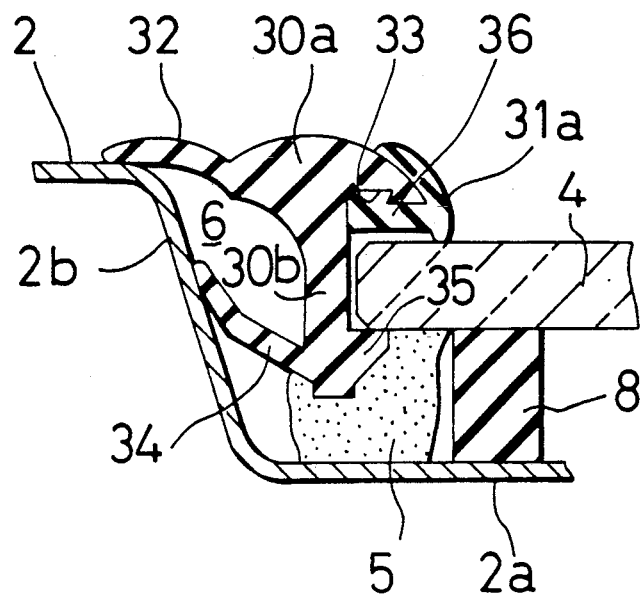
FIGS. 9 and 10 are enlarged sectional views taken along line X—X and line Y—Y in FIG. 1 in the automobile to which the molding $M_3$ is fitted, respectively.
Figure 10:
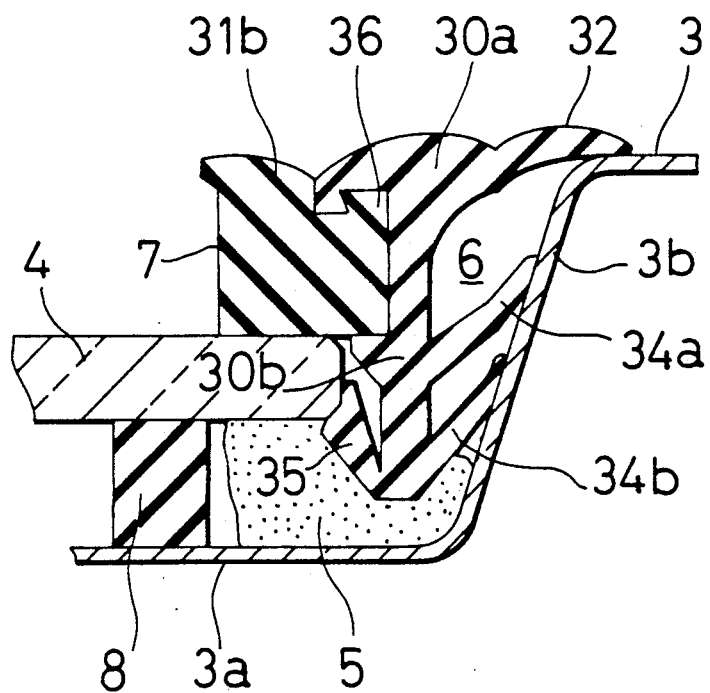

In this molding $M_2$, too, the side portion auxiliary plate 21b which is in close contact with the windshield 4 functions as the rain water groove and accordingly, the sectional shape of the molding main body 20 can be made uniform throughout its full length. Since the entire width of the decorative portion of the side molding portions is greater than that of the upper molding portion, the appearance as the molding can be much more improved FIGS. 8 to 10 shows the molding $M_3$ in accordance with the present invention. This molding $M_3$ is used when the difference in level between the windshield 4 and the car body panel increases from the upper portion towards the side portions.

The molding main body 30 comprises the decorative portion 30a and the leg portion 30b and the length of this leg portion 30b is greater at the side portions than at the upper portion. The decorative lip 32 is disposed in such a manner as to extend on the outer peripheral side of the decorative portion 30a and the fitting groove 33 is formed in the longitudinal direction on its lower surface. The panel lip 34 and the clamp lip 35 are disposed on the outer and inner peripheral sides of the lower end portion of the leg portion 30b of the molding main body 30, respectively. A first panel lip 34a is disposed at the center of the leg portion 30b of the molding main body 30 fitted to the side portions in such a manner as to extend to the outer peripheral side, and a second panel lip 34a and a clamp lip 35 are disposed on the outer and inner peripheral sides of the lower end of this leg portion 30b, respectively.

The auxiliary plate 31 comprises the upper portion auxiliary plate 31a, the side portion auxiliary plate 31b and the corner portion auxiliary plate 31c. The upper portion auxiliary plate 31a has an arcuate sectional shape and covers the inner peripheral side of the decorative portion 30a. The thickness of the side portion auxiliary plate is greater than that of the upper portion auxiliary plate 31a by the thickness corresponding to the difference in level between the windshield 4 and the car body panel and its inner peripheral surface 7 is recessed. The width of the side portion auxiliary plate 31b is by far greater than that of the upper portion auxiliary plate 31a. The fitting protuberance 36 is disposed on the outer peripheral side of the auxiliary plate 31.

The auxiliary plate 31 is fitted integrally to the molding main body 30 by fitting the fitting protuberance 36 into the fitting groove 33 and under this state, the leg portion 30b of the molding main body 30 is fitted into the gap 6 so as to bring the auxiliary plate 31 into close contact with the windshield 4. The side portion auxiliary plate 31b which is in close contact with the windshield 4 functions as the rain water groove. At each side portion of the windshield 4, on the other hand, the first and second panel lips 34a, 34b are in flexible contact with the inclined wall portion 3b of each front pillar 3 as shown in FIG. 10.

Figure 11:
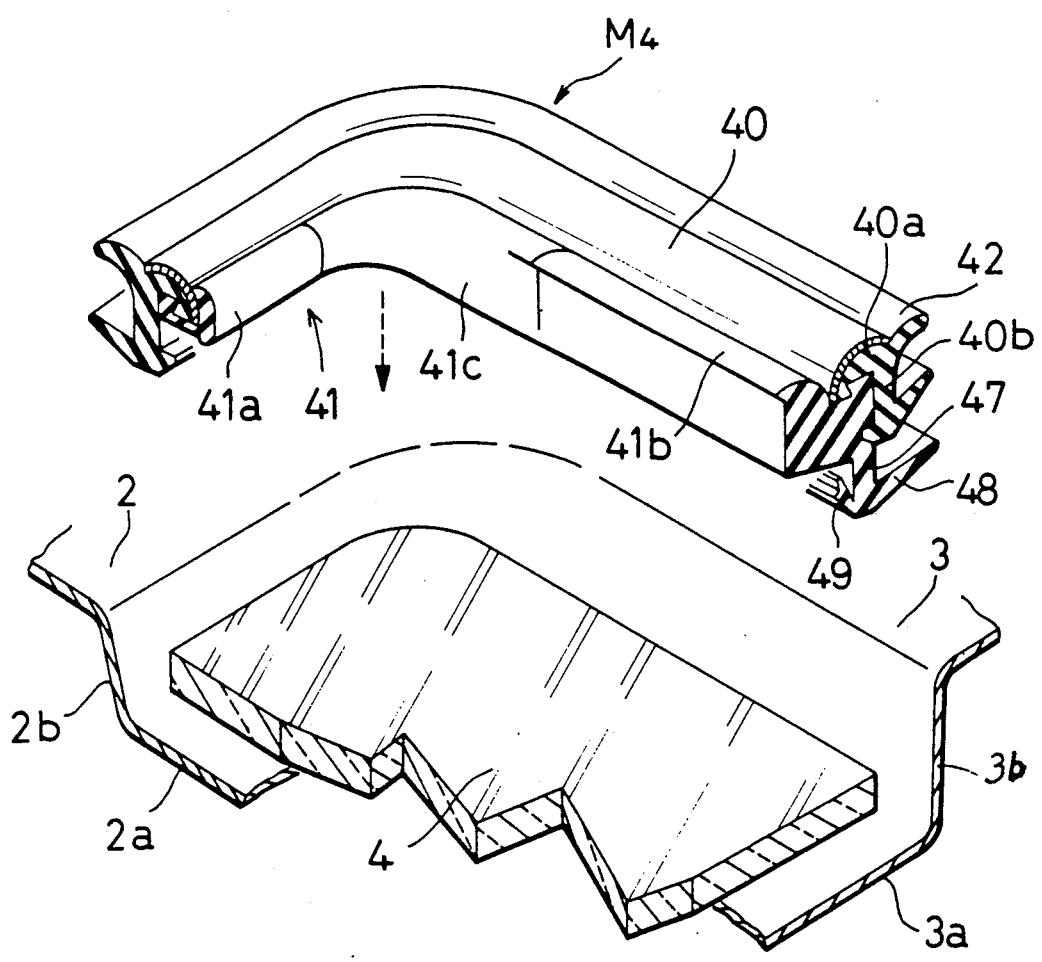
FIG. 11 is a perspective view of a molding $M_4$ and each corner portion of the car body panel.
Figure 12:
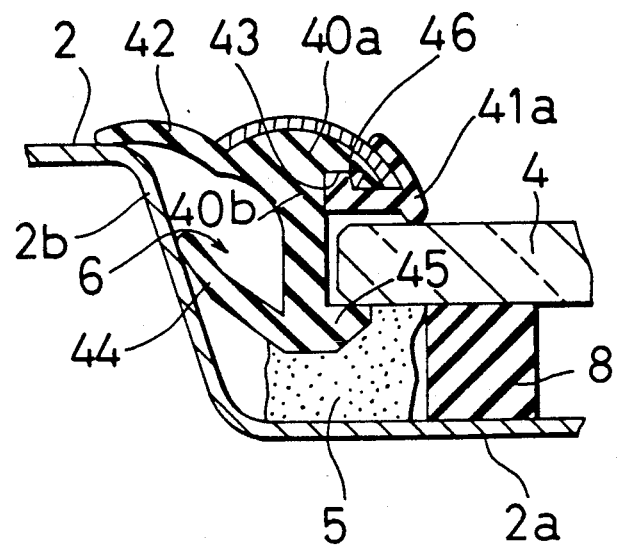
FIGS. 12 and 13 are enlarged sectional views taken along line X—X and line Y—Y in FIG. 1 in the automobile to which the molding $M_4$ is fitted, respectively.
Figure 13:
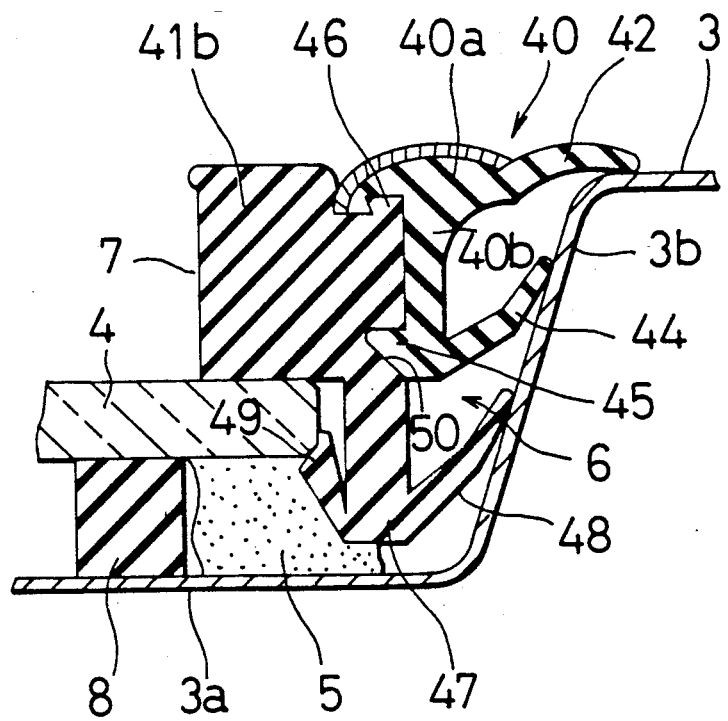

FIGS. 11 to 13 show the molding M$_4$ in accordance with the present invention. This molding M$_4$, too, is used when the difference in level between the windshield 4 and the car body panel increases from the upper portion to the side portions.

The molding M$_4$ comprises the molding main body 40 and the auxiliary plate 41. The molding main body 40 in turn comprises the decorative portion 40a and the leg portion 40b and has a uniform sectional shape throughout its full length. The decorative lip 42 is disposed on the outer peripheral side of the decorative portion 40a and the fitting groove 43 is disposed on the lower surface of the decorative portion 40a. The panel lip 44 and the clamp lip 45 are disposed on the outer and inner peripheral sides of the lower end of the leg portion 40b, respectively.

The auxiliary plate 41 comprises the upper portion auxiliary plate 41a, the side portion auxiliary plate 41b and the corner portion auxiliary plate 41c, and the fitting protuberance 46 is formed on the auxiliary plate 41. The fitting protuberance 46 described above is fitted into the fitting groove 43 of the decorative portion 40a of the molding main body 40 and thus the auxiliary plate 41 is fitted integrally to the molding main body 40. The upper portion auxiliary plate 41a has an arcuate sectional shape and decorates the inner peripheral portion of the decorative portion 40a. The thickness and width of the side portion auxiliary plate 41b are by far greater than those of the upper portion auxiliary plate 41a and an auxiliary leg portion 47 is formed integrally on the lower end surface of the side portion auxiliary plate 41b. The panel lip 48 and the clamp lip 49 are disposed on the outer and inner peripheral sides of the lower end of this auxiliary leg portion 47, respectively. The inner peripheral surface 7 of the side portion auxiliary plate 41b is recessed. At each side portion of the molding main body 40, the clamp lip 45 disposed at the leg portion 40b of the molding main body 40 is fitted into the fitting groove 50 disposed on the outer side surface of the side portion auxiliary plate 41b.

Therefore, the leg portion 40b of the molding main body 40 is fitted into the gap 6 and the upper portion auxiliary plate 41a is in close contact with the windshield 4 at the upper portion of the windshield 4. At the side portions of the windshield 4, on the other hand, the auxiliary leg portion 47 disposed in the side portion auxiliary plate 41b is fitted into the gap 6 and the side portion auxiliary plate 41b is in close contact with the windshield 4, and this side auxiliary plate 41b functions as the rain water groove. At the side portions of the windshield 4, each panel lip 44, 48 of the molding main body 40 and the side portion auxiliary plate 41b is in flexible contact with the inclined wall portion 3b of each front pillar 3.

In this molding M$_4$, the thickness of the side portion auxiliary plate 41b is increased and the auxiliary leg portion 47 is disposed there, so that the rain water groove is defined by the side portion auxiliary plate 41b and the sectional shape of the molding main body 40 is made uniform throughout its full length.

What is claimed is:

1. A belt-like molding for a windshield to be fitted into the gaps defined between the peripheral portions of the windshield of an automobile and a window frame of a car body panel, characterized in that:

said molding comprises a molding main body and an auxiliary plate, said molding main body consists of a leg portion to be fitted into said gap and a decorative portion for covering and decorating said gap, and said auxiliary plate consists of an upper portion auxiliary plate, side portion auxiliary plates and corner portion auxiliary plates, and is fitted integrally to the inner peripheral side of said decorative portion of said molding main body; and the thickness of each of said side portion auxiliary plates fitted to both sides of the windshield is greater than the thickness of said upper portion auxiliary plate to be fitted to the upper portion of the windshield, the inner peripheral surface of said side portion auxiliary plate is recessed and said side portion auxiliary plate functions as a rain water groove.

2. A molding for a windshield of an automobile according to claim 1, wherein the inner peripheral side of said decorative portion of said molding main body at the upper portion is covered with said upper portion auxiliary plate.

3. A molding for a windshield of an automobile according to claim 1, wherein an auxiliary leg portion is formed in said side portion auxiliary plate and is fitted into the gap occurring between the peripheral portion of the windshield and the window frame of the car body panel.

* * * * *